(12) United States Patent
Hosier

(10) Patent No.: US 7,760,397 B2
(45) Date of Patent: Jul. 20, 2010

(54) CALIBRATION SHEET AND METHOD OF CALIBRATING A DIGITAL PRINTER

(75) Inventor: Paul A. Hosier, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 387 days.

(21) Appl. No.: 11/716,802

(22) Filed: Mar. 12, 2007

(65) Prior Publication Data

US 2008/0225309 A1    Sep. 18, 2008

(51) Int. Cl.
H04N 1/60 (2006.01)
H04N 1/46 (2006.01)
G03F 3/08 (2006.01)
G06K 9/00 (2006.01)
B41J 2/205 (2006.01)

(52) U.S. Cl. .................. 358/1.9; 358/406; 358/504; 358/518; 382/162; 382/165; 382/167; 347/15; 347/19

(58) Field of Classification Search .............. 358/1.9, 358/406, 504, 1.14, 518, 520, 540, 3.32, 358/3.33, 1.8; 702/85; 347/15, 19, 43, 131, 347/240, 251, 14, 5; 382/162, 167, 168, 382/165; 399/49, 78
See application file for complete search history.

(56) References Cited

U.S. PATENT DOCUMENTS

| | | | |
|---|---|---|---|
| 5,488,458 A | 1/1996 | Benedict et al. | |
| 6,048,117 A | 4/2000 | Banton | |
| 6,324,353 B1 | 11/2001 | Laussermair et al. | |
| 6,684,035 B2 | 1/2004 | Furno et al. | |
| 6,975,949 B2 | 12/2005 | Mestha et al. | |
| 7,050,196 B1 * | 5/2006 | Piatt et al. | 358/1.9 |
| 7,069,164 B2 * | 6/2006 | Viturro et al. | 702/85 |
| 2004/0165199 A1 | 8/2004 | Klassen et al. | |
| 2005/0018219 A1 * | 1/2005 | Senn et al. | 358/1.8 |
| 2007/0002403 A1 | 1/2007 | Klassen | |

* cited by examiner

*Primary Examiner*—Charlotte M Baker
(74) *Attorney, Agent, or Firm*—Pillsbury Winthrop Shaw Pittman LLP

(57) ABSTRACT

A method of controlling a color printing apparatus takes into account variations in color quality across a sheet, perpendicular to the process direction. The apparatus outputs a print sheet forming a test print, the test print including at least one primary strip extending along a cross-process direction of the printer, and a set of test patches. The test print is read, the reading including measuring actual colors of each of a plurality of portions of the primary strip along the cross-process direction. An in-line spectrophotometer, with an array of photosensors extending across the sheet path, can be used to make measurements across the primary strip.

19 Claims, 3 Drawing Sheets

US 7,760,397 B2

CALIBRATION SHEET AND METHOD OF CALIBRATING A DIGITAL PRINTER

CROSS-REFERENCE TO RELATED APPLICATIONS

Cross-reference is hereby made to the following applications: patent application Ser. No. 10/372,558, filed Feb. 25, 2003, and now U.S. Published Patent Application US 2004/0165199; and patent application Ser. No. 11/170,975, filed Jun. 30, 2005; and now U.S. Published Patent Application US 2007/0002403.

TECHNICAL FIELD

The present disclosure relates to image control and calibration of a digital printing apparatus, particularly in the creation and testing of calibration sheets.

BACKGROUND

U.S. Pat. No. 6,975,949 describes a digital printer having a full-width array scanning spectrophotometer. A spectrophotometer is a device that measures fine gradations in color of light reflected from a target surface; these fine measurements can be used to calibrate or otherwise control a digital color printer, by examining images produced by the printer. A "full-width array" indicates that at least a large portion of the width across the paper output path is examined, such as by one or more long linear arrays of photosensors, so that a large portion of a printed image is effectively tested by the spectrophotometer.

As mentioned in the '949 patent, a full-width array scanning spectrophotometer is readily adapted from such an array used in image input, such as for a digital color copier. Being able to sample color outputs from across the full width of a sheet being output is useful from the standpoint of checking for certain types of image quality phenomena. For instance, if the marking technology used by the printer involves an ink-jet printhead or an LED bar, deficiencies in a portion of the printhead or bar will be manifest only in a portion of the resulting printed image; being able to survey the full width of the output print sheet is therefore valuable in isolating print defects.

In a high-speed, production context, it is known to provide detectors and image sensors immediately downstream of a printing apparatus for various purposes, as shown in U.S. Pat. Nos. 5,488,458; 6,324,353; and 6,684,035.

SUMMARY

According to one aspect, there is provided a method of controlling a printing apparatus, the printing apparatus capable of applying to a print sheet a colorant of each of a plurality of primary colors. The apparatus outputs a print sheet forming a test print, the test print including at least a first primary strip extending a length in a direction corresponding to a cross-process direction of the printer, and a set of test patches. The test print is read, the reading including measuring actual colors of each of a plurality of portions of the primary strip along the cross-process direction.

DETAILED DESCRIPTION

Figure 1:
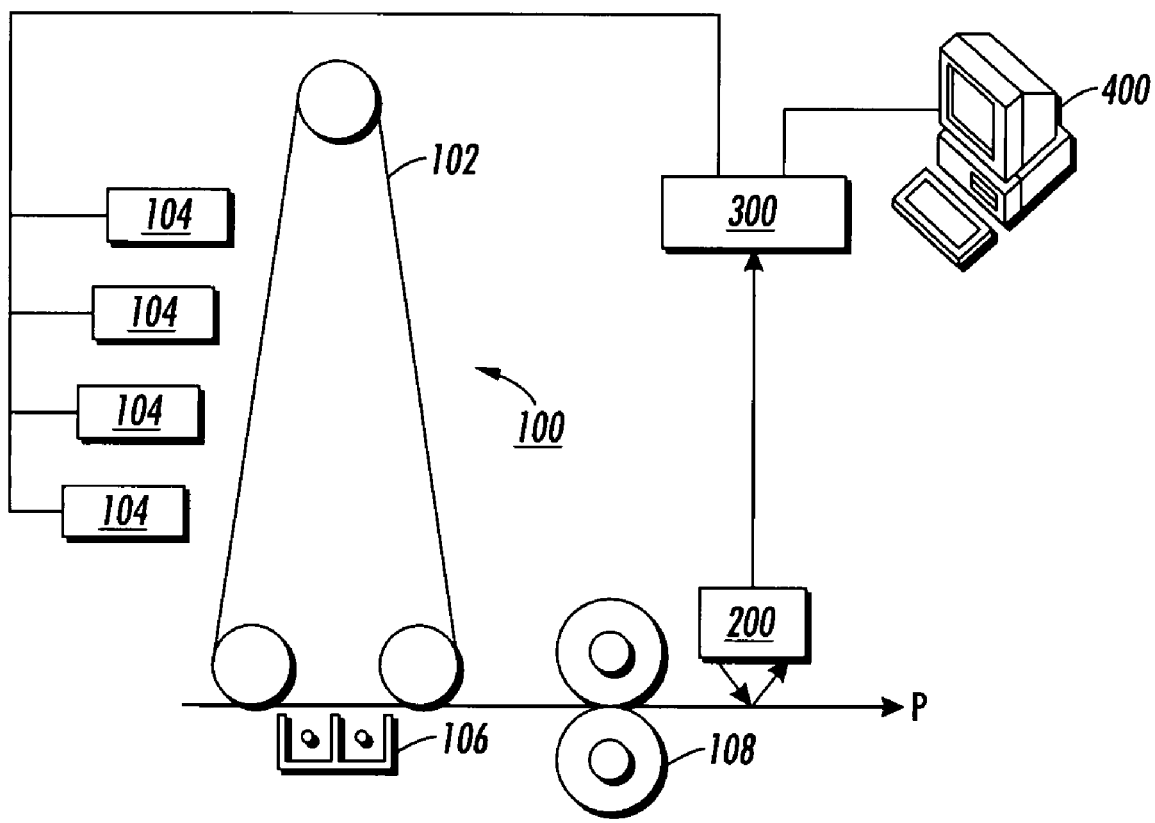
FIG. 1 is a simplified elevational view of a printing system.

FIG. 1 is a simplified elevational view of a printing system, in which images are placed on sheets in response to digital data sent thereto. For purposes of the present discussion, the specific type of marking technology is immaterial except for the fact that the print engine can be modified by the application of control signals thereto, as is generally familiar in the art.

The printing apparatus of FIG. 1 is a production-speed xerographic printer. The print engine 100 is of a type generally familiar in the art: a photoreceptor 102 rotates past imaging stations 104, one imaging station for each CMYK primary color, and each including (not shown) a charge device, laser, and development unit. Each imaging station, controlled by digital data supplied thereto, places toner according to a color separation of a desired image on the photoreceptor 102, and the total color image is then transferred to a print sheet at transfer station 106. The print sheet then moves in a process direction P through a fusing station 108, and continues, at a constant velocity. Control system 300 and external computer 400 are also used to aid the operation of the print engine 100.

In practical use, digital printers are possibly prone to what can be called "cross-process variance," meaning the actual coverage of marking material is not uniform across the cross-process direction. This cross-process variance may result from particular properties of an ink-jet printhead or some xerographic component.

Figure 2:
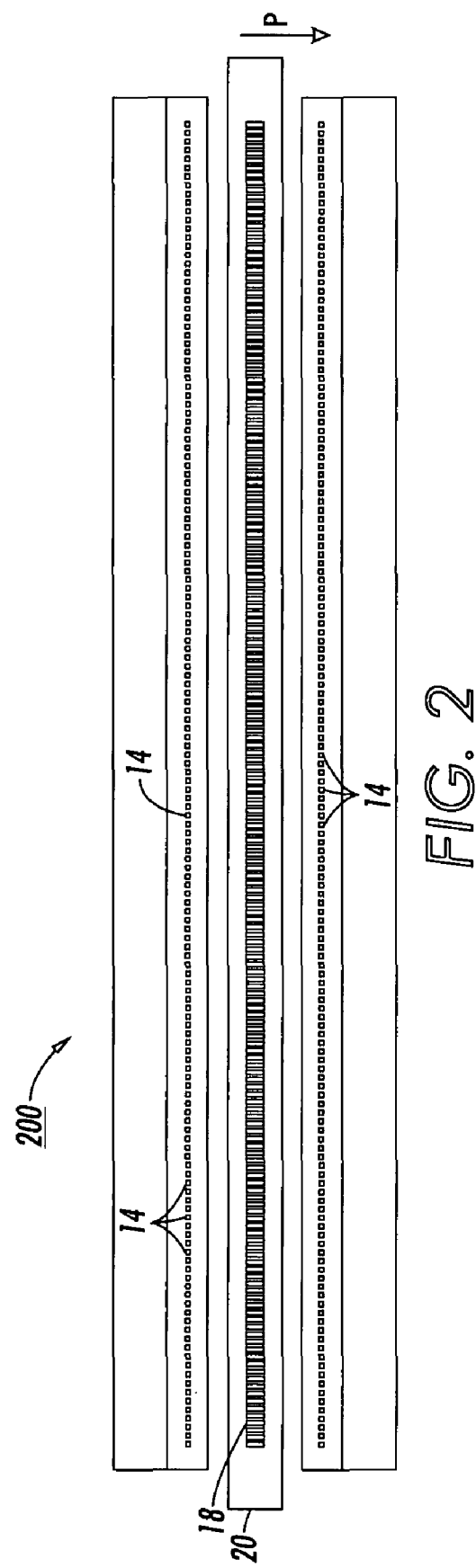
FIG. 2 is a plan view of a photosensor device useable for image testing in combination with the printing system of FIG. 1.

Substantially immediately after the end of the printing process, a printed sheet can be viewed by a "full-width in-line spectrophotometer," generally indicated as 200. FIG. 2 is a plan view of a photosensor device useable for image testing in combination with the printing system of FIG. 1. Arrays of LEDs indicated as 14 emit light onto print sheets moving there past, and the light reflected from the images on the sheets are recorded by arrays of photosensors 18 disposed on substrate 20. In a practical embodiment, there may in fact be several arrays of photosensors, each array being sensitive, such as by means of translucent filters, to one primary color, thus yielding a combined full-color signal. The spectrophotometer 200 can read, in a manner generally familiar in the art, images on print sheets output by the printer and yield precise signals about the actual color properties of the image relative to target values, such as for calibration. As used herein, the term "read" can encompass any type of recording of, and/or analysis based on data derived from, light reflected from the test print or other image. As used herein, the term "spectrophotometer" can be construed broadly to encompass any device capable of color measurement with a reasonable resolution in color space.

The array 18 of photosensors in spectrophotometer 200 is, in this embodiment, capable of extending at least through a substantial portion of the "cross-process direction" of a printed image, i.e., substantially perpendicular to the process direction P as shown in FIG. 1. As such, the spectrophotometer 200 may include one or more arrays of image sensors extending across the cross-process direction, so that pixel-sized small areas can be precisely sampled on a test print. An example of a full-width in-line spectrophotometer useable as spectrophotometer 200 is given in U.S. Pat. No. 6,975,949, described above. (Although an in-line spectrophotometer 200 is shown, the overall system can be carried out with a separate scanning system in communication with a printer 100, such as shown in U.S. Pat. No. 6,048,117.)

Figure 3:
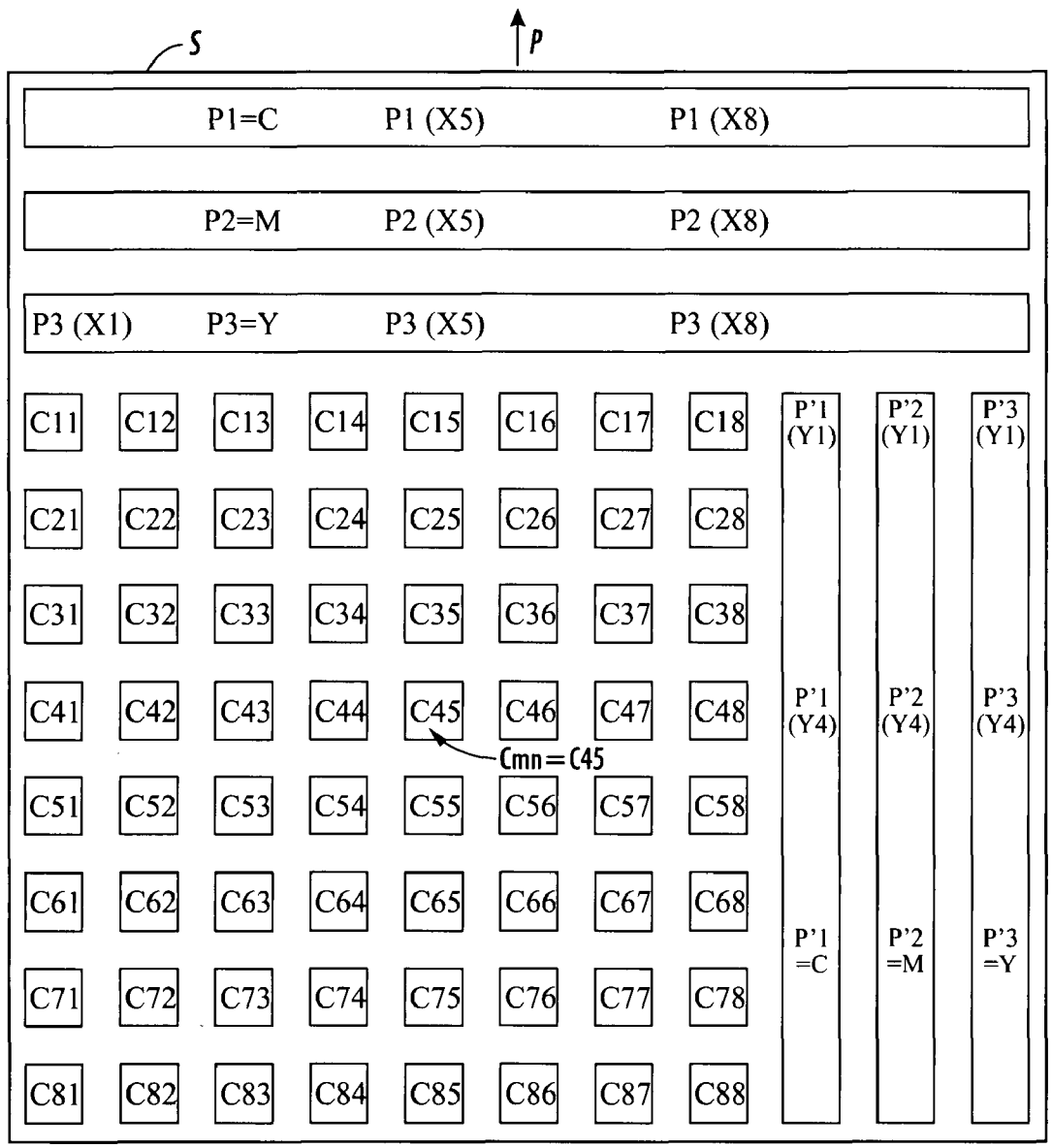
FIG. 3 is a diagram of an image to be selectably output on a test print by the printing system.

Conceivably any image output by the printer can be used for various purposes by the spectrophotometer 200, but in the present embodiment, the printer is caused to output a "test print" of a particular configuration. FIG. 3 is a diagram of an image to be selectably output on a test print by the printer and then read by a full-width in-line spectrophotometer such as spectrophotometer 200.

As can be seen in FIG. 3, the test print image on sheet S includes a two-dimensional array of test patches, numbered in the Figure C11-C88. Each patch is printed to be a particular predetermined target color. The target colors selected for the various patches can represent large or small portions of the total gamut of the printer, depending on a need at a particular time.

Extending along the edges of the two-dimensional array of test patches are at least one set of "primary strips," indicated at P1, P2, P3. In one embodiment, each primary strip is printed with substantially one primary colorant (typically cyan, magenta, yellow) producible by the printer. In the test print the target coverage of the colorant (ink, toner, etc.) should be constant along each primary strip, although each strip does not require 100% coverage of the colorant. Each primary strip should extend a significant distance along the cross-process direction, corresponding to the cross-process direction of the two-dimensional array. Although continuous strips of color are shown, it is conceivable that each primary strip could be printed as a set of separate patches: the strip effectively extends across several rows or columns of patches in the two-dimensional array, so that process or cross-process variations in output color can be evident in the test print.

Also shown in FIG. 3 is a set of process-direction primary strips P'1, P'2, P'3, which extend along the process direction P adjacent the array of test patches. These primary strips can be used to isolate variations of color application along the process direction, commonly called "banding" and often relating to improper rotation of rolls within the print engine 100.

Use of the primary strips enables isolation of cross-process variance for each primary color laid down by the printer. For instance, if there is cross-process variation along primary strip P1(c), the reflectivity of the colorant (cyan toner or ink) will be different between the area shown at P1(X5) and P1(X8), or in other words, between the fifth and eighth columns of patches in the two-dimensional array, as shown in the Figure. The configuration of the primary strips and the test patches enables a calibration process to take into account cross-process variance for each primary color when calibrating the printer with the test patches.

According to one method, a print engine 100 is caused (such as through computer 400 and control system 300) to print out a test image such as shown in FIG. 3. Once the test print is created by the printer 100, the actual values of the various color test patches in the test print are measured by spectrophotometer 200 and the resulting color data, i.e., the actual color of each color area is determined in color space, is compared to data relating to the intended or target color of the test patch. The difference in color space between the target color and the actual color for each test patch is then used to calibrate the printer for future prints.

The following description relates to an embodiment of how image data from a test image on a sheet S is used to obtain correction data for overall control of the print engine 100, via control system 300. In the below equations, the measured (actual) color readings from various color test patches defined by row m, column n (as numbered in FIG. 3) are entered to obtain correction values L', a', b' for each test patch (Cmn). It will be noted that a constant in the equations is the primary color component for column n=5, which in this embodiment is equal to the intended amount of the corresponding colorant in the associated primary strip.

Further in the equations below, one type of input is the recorded value of the color of the primary strip in a location corresponding to a row or column in the array of test patches. Thus, for example, the value of X5, as read and recorded by the spectrophotometer 200, relates to the location along a primary strip P1, P2, or P3 aligned with column 5; the value of X8 similarly relates to the location along a primary strip P1, P2, or P3 aligned with column 8. In the other dimension, the value of Y1 to the location along a primary strip P1, P2, or P3 aligned with row 1; the value of Y4 similarly relates to the location along a primary strip P1, P2, or P3 aligned with row 4, and so forth with each row and column. The relatively high spatial resolution of a full-width spectrophotometer such as 200 enables recording the fine distinctions of color quality along the primary strips; in this way the process and cross-process variations of a printer 100, manifest in variations of color quality along the primary strips, can be isolated and used, mathematically, in correction algorithms.

In one practical embodiment, the correction algorithms for obtaining corrected values L'a'b' of the various colors in device-independent space are as follows for each test patch Cmn. In this set of equations, the correction values are in effect normalized to the portion X5 of the primary strips, corresponding to column 5, but any column can be used as the normalizing column:

$$L'(Cmn)=L(Cmn)+k_{11}(Cmn)*[L_1(Xn)-L_1(X5)]+k_{12}(Cmn)*[L_2(Xn)-L_2(X5)]+k_{13}(Cmn)*[L_3(Xn)-L_3(X5)],$$

$$a'(Cmn)=a(Cmn)+k_{21}(Cmn)*[a_1(Xn)-a_1(X5)]+k_{22}(Cmn)*[a_2(Xn)-a_2(X5)]+k_{23}(Cmn)*[a_3(Xn)-a_3(X5)],$$

$$b'(Cmn)=b(Cmn)+k_{31}(Cmn)*[b_1(Xn)-b_1(X5)]+k_{32}(Cmn)*[b_2(Xn)-b_2(X5)]+k_{33}(Cmn)*[b_3(Xn)-b_3(X5)].$$

In the equations, the linear constants $k_{11}$ $k_{12}$ $k_{13}$ $k_{21}$ $k_{22}$ $k_{23}$ $k3_{11}$ $k_{12}$ $k_{33}$ can be determined from a model, or empirically by running several prints on print engine 100 with the toner concentration high and low for each primary, one at a time and noting the change in Lab of each patch and each corresponding value of Lab on the primary strip.

The calculated corrected values L'a'b', expressed in device-independent color space, are then applied to the operation of the print engine 100. After all measured patch values are corrected for cross process marking variation, an optimum color correction is determined to minimize the color error of all patches. This color correction is applied on top of what is already being used in the print engine control software to come up with a more accurate adjusted transformation.

If pixel by pixel tone response curves (TRCs) exist for each primary color component in print engine 100, the TRCs for each pixel should be adjusted based on the Lab values measured at each cross process location, with simple interpolation between the center of each average area scanned along the primary strip. Again, the TRC to Lab sensitivity can be determined from a model or as described above by sensitivity analysis.

Although the illustrated embodiment a two-dimensional array of test patches is shown, in alternative embodiments the various test patches could be in a one-dimensional array, although in such a case it would still be desirable to be able to sample portions of a cross-process direction primary strip at distinct locations. Such sampling could be provided through an offline scanning system or a relatively small spectrophotometer capable of moving as required along the cross-process direction. Such a spectrophotometer could then be retained in one place during output of test sheets, to successively read test patches arranged in one dimension along the process direction.

As used herein, the term "primary" color can refer not only to the common basic subtractive primary colors used in printing, such as yellow, magenta, and cyan, but also to any type of colorant used to form a desired target color on a print sheet, such as, for example, red, green, or blue (used in seven-color printing systems), "process black," or any colorant used for a special purpose.

As used herein, the term "algorithm" can mean a plurality of algorithms, or one of a plurality of algorithms.

Although the described embodiment shows the test image printed on a single print sheet, in alternative embodiments portions of the test image, such as various primary strips and test patches, can be placed and read among a plurality of print sheets.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method of controlling a printing apparatus, the printing apparatus capable of applying to a print sheet a colorant of each of a plurality of primary colors, comprising:
   the apparatus outputting a print sheet forming a test print, the test print comprising a first primary strip corresponding to a single primary color producible by the apparatus extending a length in a direction corresponding to a cross-process direction of the printer, and a set of test patches;
   reading the test print, the reading including measuring actual colors of each of a plurality of portions of the primary strip along the cross-process direction;
   isolating cross-process variance of the single primary color of the first primary strip based on said measurement by:
      calculating correction values for the primary color, at different locations along the cross-process direction, based on an algorithm that takes into account the difference between the measured color and a target color value of the primary color at each of the locations along the cross-process direction; and
   calibrating the printing apparatus for subsequent prints so as to adjust the color of said prints corresponding to the primary color using said correction values.

2. The method of claim 1, wherein isolating cross-process variance of the single primary color is a one-time process.

3. The method of claim 1, the calculating including effectively normalizing the correction values relative to one portion of the primary strip.

4. The method of claim 1, the first primary strip substantially consisting of a primary color producible by the apparatus.

5. The method of claim 1, the test print including a plurality of primary strips, each primary strip substantially corresponding to a single different color producible by the apparatus and processed in an analogous manner as the first primary strip.

6. The method of claim 1, the set of test patches forming a two-dimensional array.

7. The method of claim 6, the predetermined portions of the primary strip being aligned with columns of test patches in the two-dimensional array.

8. The method of claim 1, the apparatus outputting print sheets through a process direction, and
   the reading including reading by a spectrophotometer effectively extending a length corresponding to the cross-process direction of the printer.

9. The method of claim 8, the spectrophotometer including at least one linear array of photosensors, the array of photosensors extending a length corresponding to the cross-process direction of the printer.

10. The method of claim 1, further comprising:
    the print including at least one process direction primary strip, the process direction primary strip extending a length corresponding to the process direction of the printer.

11. The method of claim 10, the set of test patches forming a two-dimensional array, the process direction primary strip being disposed adjacent the two-dimensional array.

12. The method of claim 1, wherein, after all measured patch values are corrected for cross process marking variation, performing an additional color correction to minimize the color error of all patches.

13. The method of claim 1, further comprising:
    correcting for the cross-process variance of the single primary color of the first primary strip.

14. The method of claim 1, wherein the first primary strip comprises a plurality of separate patches of the same color.

15. The method of claim 1, wherein both the measured colors values and the target color values are in a device-independent color space.

16. The method of claim 1, wherein the algorithm comprises:

$$L'(Cmn)=L(Cmn)+k_{11}(Cmn)*[L_1(Xn)-L_1(XR)]+k_{12}(Cmn)*[L_2(Xn)-L_2(XR)]+k_{13}(Cmn)*[L_3(Xn)-L_3(XR)],$$

$$a'(Cmn)=a(Cmn)+k_{21}(Cmn)*[a_1(Xn)-a_1(XR)]+k_{22}(Cmn)*[a_2(Xn)-a_2(XR)]+k_{23}(Cmn)*[a_3(Xn)-a_3(XR)], \text{ and}$$

$$b'(Cmn)=b(Cmn)+k_{31}(Cmn)*[b_1(Xn)-b_1(XR)]+k_{32}(Cmn)*[b_2(Xn)-b_2(XR)]+k_{33}(Cmn)*[b_3(Xn)-b3(XR)]$$

where
   L' a' b' is a corrected color value;
   L a b, $L_1$ $a_1$ $b_1$, $L_2$ $a_2$ $b_2$, $L_3$ $a_3$ $b_3$ correspond to measured color values;
   Cmn identifies a test patch;
   XR identifies a reference portion of the primary strip;
   Xn identified a portion of the primary strip; and
   $k_{11}$, $k_{12}$, $k_{13}$, $k_{21}$, $k_{22}$, $k_{23}$, $k_{31}$, $k_{32}$, and $k_{33}$ are constants.

17. The method of claim 16, wherein the constants are determined from a model, or empirically, by printing a one or more prints with high and low concentrations of the primary color.

18. The method of claim 1, further comprising:
    printing a print with the printing apparatus, the print corresponding to the primary color;
    reading the print, the reading including measuring actual colors of each of a plurality of portions of the print along the cross-process direction; and
    adjusting the measured colors of the print corresponding to the primary color using said correction values.

19. The method of claim 1, wherein said adjusting, at the different locations along the cross-process direction, is on a pixel-by-pixel basis.

* * * * *